(12) United States Patent
Webb

(10) Patent No.: US 6,226,044 B1
(45) Date of Patent: May 1, 2001

(54) FIELD SYNCHRONIZATION SYSTEM AND TECHNIQUE

(75) Inventor: Curtis M. Webb, Woodbridge, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 08/351,201

(22) Filed: Nov. 30, 1994

(51) Int. Cl.[7] ...................................................... H04N 5/10
(52) U.S. Cl. ............................................ 348/526; 348/530
(58) Field of Search .................................... 348/525, 526, 348/527, 513, 500, 529, 531, 530, 501, 511, 705, 706, 164–168; H04N 5/08, 5/10

(56) References Cited

U.S. PATENT DOCUMENTS

| | | | |
|---|---|---|---|
| 4,460,918 | * | 7/1984 | Flasza ................................... 348/706 |
| 5,025,496 | * | 6/1991 | Canfield ............................... 348/526 |
| 5,327,175 | * | 7/1994 | Kim ..................................... 348/526 |

OTHER PUBLICATIONS

"Imaging With Speed Trapix Plus" Recognition Concepts, Inc. product brouchure, Jan. 13, 1996.*
Society of Motion Picture and Television Engineers; "Proposed SMPTE Standard for Television—System M/NTSC Composite Video Signals–Bit–Parallel Digital Interface"; Oct., 1993; pp. 1–17.

* cited by examiner

*Primary Examiner*—Michael Lee
(74) *Attorney, Agent, or Firm*—Milton W. Lee; John E. Holford; Alain L. Bashore

(57) ABSTRACT

A field synchronization system of a field detect circuit adaptable for use with non-standard output digital data of forward looking infrared (FLIR) sensors. Timing signals and digital data from a FLIR sensor are utilized and there is outputted a vertical and horizontal signal output. A bypass circuit allows for the optional bypass of frame grabber generated field index circuitry so that an external field index signal is utilized.

2 Claims, 3 Drawing Sheets ically) FIELD SYNCHRONIZATION SYSTEM AND TECHNIQUE

BACKGROUND OF THE INVENTION

1. Field of the Invention

The present invention generally relates to a field synchronization system and technique and more specifically, to a field synchronization system and technique of a field detect circuit adaptable for use with non-standard output digital data ports of forward looking infrared (FLIR) sensors.

2. Description of Prior Art

Television is the transmission of scenes, either still or in motion, by electrical means. It is necessary to break up the scene into minute elements and utilize these elements in an orderly sequence. This process is called scanning, a type of which is somewhat similar to the process of reading a text line-by-line (or row of data) from a printed page (called interlacing). Because of the physical principles involved, there is a relationship between brightness and the rate of scanning: brightness going down with increase scanning rate. To provide a true and realistic feeling of motion to all actions displayed, it is necessary to present a number of pictures or frames per second. Early designers in compromising on brightness, utilized a reasonable transmission bandwidth, and frame frequency, selected a rate of display of 30 complete pictures per second. A frame frequency of only 30 pictures/second would result in a flicker discernible to the eye, so each picture is divided into two parts called fields. Two fields must be produced in order to make one complete picture or frame. The field frequency is therefore 60 fields/second and the frame frequency is 30 frames/second. Each field contains one-half of the total picture elements.

For a decernible picture to be presented, there requires a digital timing protocol for the differentiation and synchronization of the two fields into one interlaced frame of digital information that is utilized by a field detect circuitry. A problem occurs in the prior art when the digital data inputs to the field circuitry does not follow the SMPTE Standard 244M known in the Prior Art. Many FLIR sensors output their own field index but do not follow the accepted protocol with respect to the falling edges of the horizontal and vertical synchronization signals. While the prior art has reported using field detect circuits, none have established a basis for a specific apparatus that is dedicated to the task of resolving the particular problem at hand. What is needed in this instance is a field synchronization system and technique of a field detect circuit adaptable for use with non-standard output digital data ports of forward looking infrared (FLIR) sensors.

SUMMARY OF THE INVENTION

It is therefore one object of the invention to provide a field synchronization system and technique of a field detect circuit adaptable for use with non-standard output digital data ports of forward looking infrared (FLIR) sensors.

According to the invention, a field synchronization system of a field detect circuit adaptable for use with non-standard output digital data of forward looking infrared (FLIR) sensors is disclosed. Timing signals, along with digital data are input from a FLIR sensor. There is output from a frame grabber, the vertical and horizontal signal outputs, and a generated field index signal. A Jumper allows for user selection of the standard frame grabber generated field index signal or the externally provided field index signal, thus bypassing the frame grabber field index circuitry.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

A prior art technical standard by the Society of Motion Picture and Television Engineers (SMPTE) is recognized as a standard for timing protocol which is utilized in the prior art field detect circuits. The SMPTE standard 244M digital timing protocol utilizes a TTL voltage level vertical synchronization signal operating at a 60 Hz interval rate to indicate the start of each field of 30 Hz rate digital data. Normal timing protocol dictates that the raising edge of a vertical sync occur every $\frac{1}{60}$ sec (60 Hz) to indicate the start of a new field. At the time the raising edge of the vertical sync pulse occurs, the 30 Hz signal of the field sync goes high and remains high for a period of $\frac{1}{60}$ of a second during which time the data being transferred is defined as field one. $\frac{1}{60}$ of a second after the raising edge of the field sync has occurred the signal goes low. While the field sync is low the data that is transferred belongs in field two. The horizontal pulse indicate the start of a new line within each field. This synchronization technique is known in the art as "frame grabbing" and is utilized in electronic boards which are functionally called frame grabbers. Unfortunately, not all frame grabbers utilize the above described technique.

Figure 1:
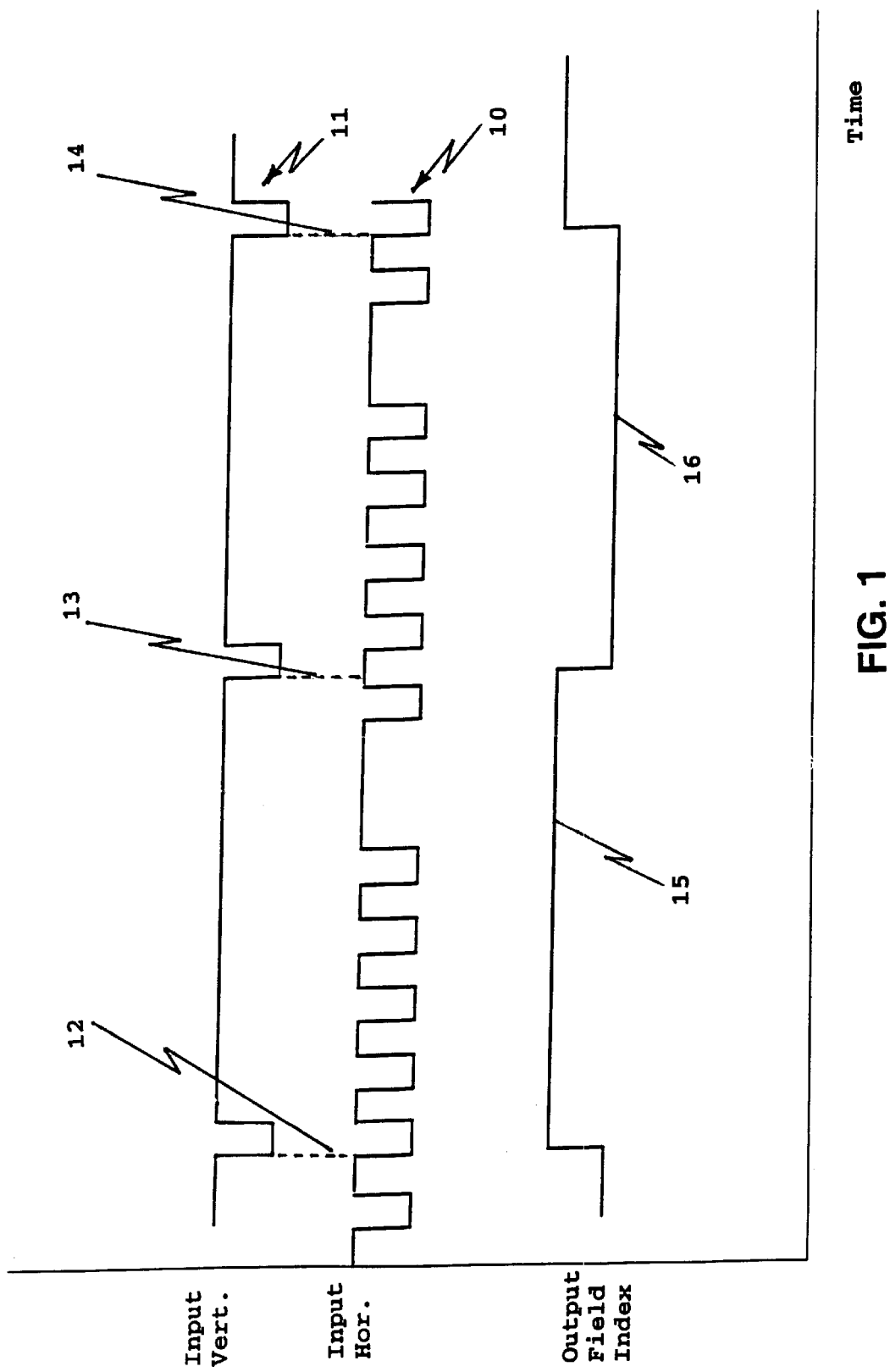
FIG. 1 is a diagram of timing waveform signals of the Prior art.

Referring now to the drawings, and more particularly to FIG. 1, there is shown the timing waveform signals format of the prior art TRAPIX PLUS circuit board which utilizes only vertical and horizontal synchronization. The TRAPIX PLUS frame grabber is a prior art frame grabber manufactured by Recognition Concepts, Inc. of Carson City, Nev. The prior art format shown in FIG. 1 utilizes a series of horizontal synchronization pluses (10), operating at a rate applicable for the number of information lines within a field. This synchronization signal is used to indicated the start of a new line (row) of data within a field. The SMPTE Standard 244M digital format distinguishes the data of field one of a given frame from field two of that same frame by either the simultaneous occurrence, or lack thereof, of the falling edges of the vertical (11) and horizontal synchronization pulses (10). If a falling edge (12–14) of a horizontal synchronization pulse occurs at the same time as the falling edge of a vertical synchronization pulse (as shown in FIG. 1), then the associated digital data which follows is assigned to field one (15) of that frame. If a falling edge of a vertical synchronization pulse occurs at a time which is not coincident with a falling edge of a horizontal synchronization pulse, the data which follows is dictated as field two (16) of that frame.

Figure 2:
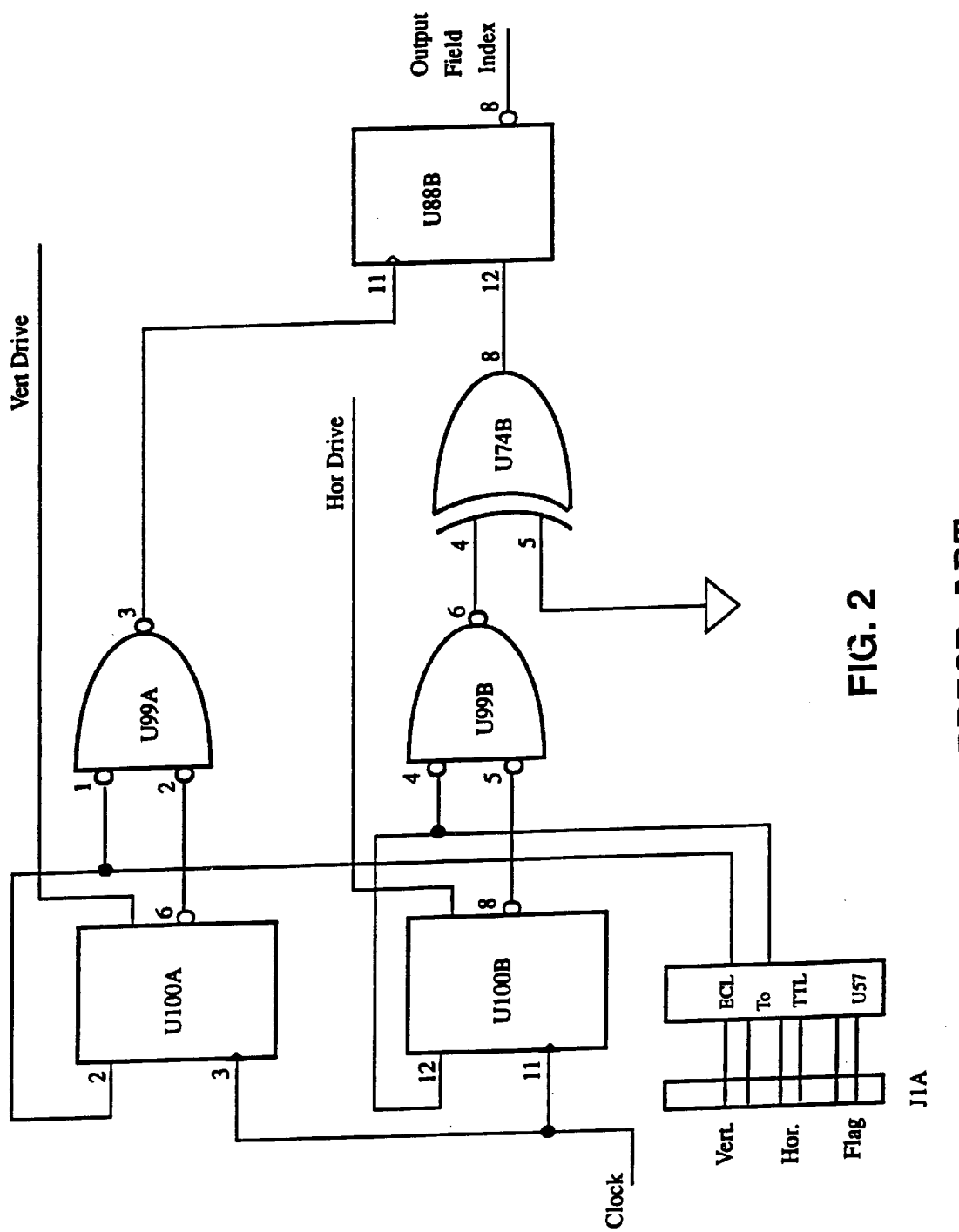
FIG. 2 is the field detect circuitry of the prior art TRAPIX PLUS frame grabber.

FIG. 2 is the field detect circuitry of the prior art TRAPIX PLUS frame grabber. The timing signals, along with the digital data are input to a Digital Port Interface (KDPI) board, Model 104162, of the TRAPIX PLUS 4B frame grabber through connector J1A. The timing signals and data are then converted from differential Emitter Coupled Logic (ECL) to signal ended Transistor Transistor Logic (TTL)

voltage levels (U57) and the timing signals are sent to the field detect circuit (shown in FIG. 2) within the KDPI board. The TRAPIX PLUS 4B frame grabber utilizes this field detect circuit as means of distinguishing the coincident occurrences, or lack thereof, of the falling edges of the horizontal and vertical synchronization signals as dictated by SMPTE Standard 224M. The output of the field detect circuit (Pin 8 of chip U88B) is a 30 Hz field index sync signal which is used throughout the KDPI board for frame and field synchronization of the digital data.

Figure 3:
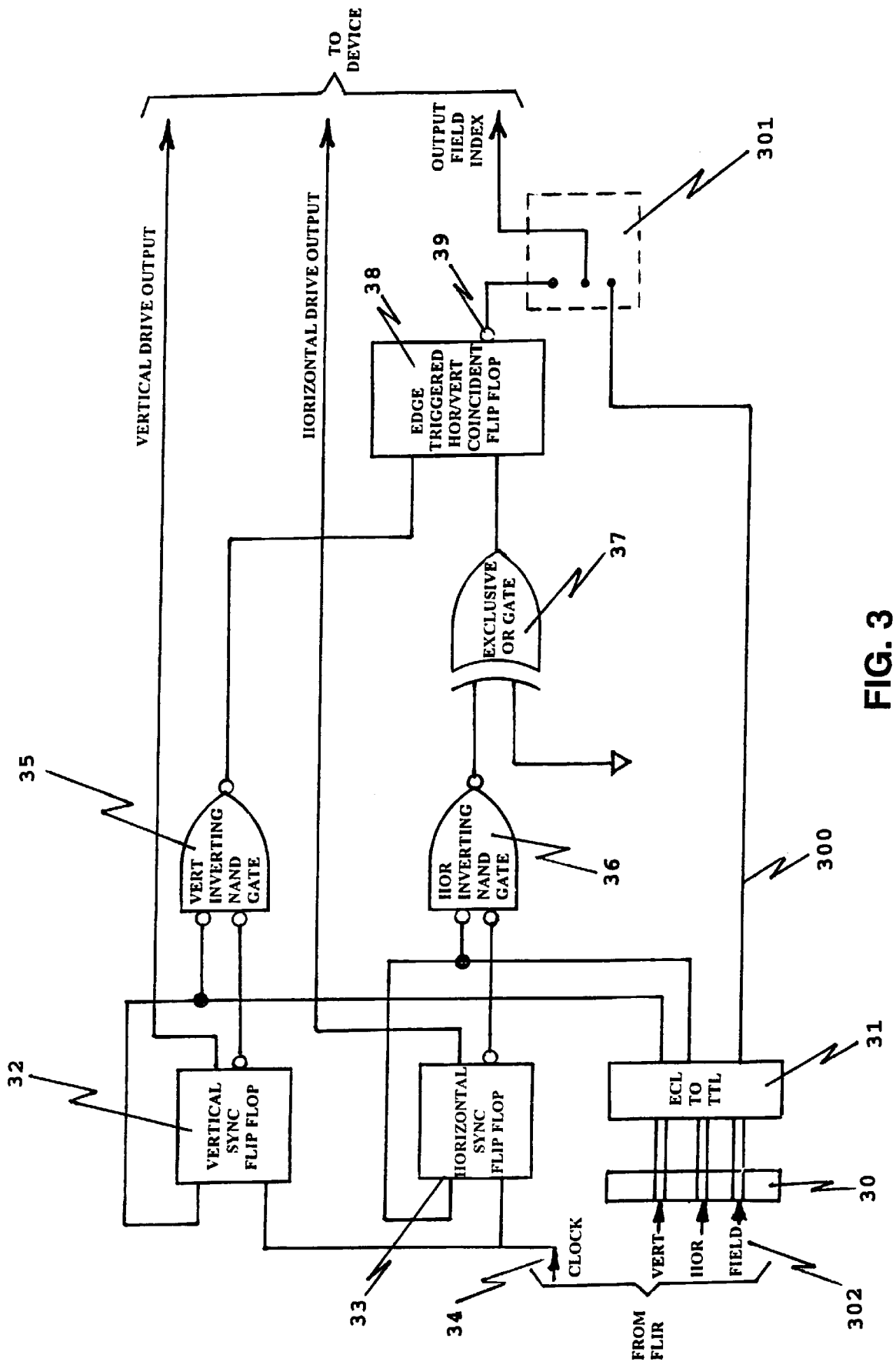
FIG. 3 is the field detect circuitry of the present invention.

FIG. 3 is the field detect circuitry of the present invention. The timing signals, along with the digital data are input through connector 30. The present embodiment utilizes the field signal from a FLIR that normally would not be utilized with the Prior Art frame grabbers in addition to the vertical and horizontal data inputs. Vertical sync flip flop 32 and horizontal sync flip flop 33 are edge trigger flip flops which are clocked by pixel clock 34 of the FLIR sensor and are used to assure that the synchronization signals are in phase with pixel clock 34. The outputs of Vertical sync flip flop 32 and horizontal sync flip flop 33 are sent to vertical inverting NAND gate 35 and horizontal inverting NAND gate 36 (via exclusive OR gate 37) which configure the horizontal and vertical sync signals for leading edge triggering of the signals at the horizontal/vertical (hor/vert) coincident flip flop 38. The vertical sync signal is output from vertical inverting NAND gate 35 and is sent as the clock input to the edge triggered hor/vert coincident flip flop 38. The horizontal sync signal is attached to the data input pin of hor/vert coincident flip flop 38 which is thus triggered by the vertical sync signal.

At the occurrence of a falling edge of the vertical sync signal the state of the horizontal sync signal is latched and held in the hor/vert coincident flip flop 38. If the vertical and horizontal sync signals are coincident, then the state of the horizontal sync is latched and held as low (shown as falling edge 12 of FIG. 1). If the horizontal and vertical sync signals are not coincident then the state of the horizontal sync is high (shown as falling edge 13 in FIG. 1). A high signal latched and held in the hor/vert coincident flip flop 38, whereby the output of hor/vert coincident flip flop 38 inverts the held state of the signal of hor/vert coincident flip flop 38. Hor/vert coincident flip flop 38 holds the state until the next occurrence of the vertical sync signal. The resulting waveform from pin 39 of hor/vert coincident flip flop 38 is a 30 Hz, 50% duty cycle output field index as described for FIG. 1. Line 300 of converter 31 is routed to three pin jumper 301.

Jumper 301 allows for user selection of the standard frame grabber generated field index or the externally provided field index, thus bypassing the frame grabber field index circuitry. When pins J1 and J2 of the Field Select Jumper 301 are connected the frame grabber operates in its originally designed configuration. When pins J2 and J3 of Frame Select Jumper 301 are connected, the Frame grabber operates in its modified form, where line 300 bypasses the field detect circuitry, resulting in the acceptance of an external field index 302 along with clock 24 of the FLIR to output the externally provided field index, vertical drive output, and horizontal drive outputs.

The development of second generation thermal imagers relies on digitized imagery as a means of data transfer to such devices as Automatic Target Recognizers (ATR) and digital displays. The information from the FLIR is digitized and output in a format suitable for interface with one of these devices. A frame grabber is used to acquire and analyze this data as a means of acquiring the digital data prior to display on a digital display or being processes by an ATR. The invention described would be applicable for any frame grabber which follows the SMPTE standard 244M as a means of frame synchronization in which an internal field index is generated within the frame grabber from externally supplied horizontal and vertical signals. It is understood that the invention is not limited to the specific FLIR and Frame Grabber utilized in the present embodiment.

While this invention has been described in terms of preferred embodiment consisting of a field detect circuit utilized in a specific model frame grabber, those skilled in the art will recognize that the invention can be practiced with modification within the spirit and scope of the appended claims.

Having thus described my invention, what I claim as new and desire to secure by Letters Patent is as follows:

1. A field synchronization system of a field detect circuit adaptable for use with non-standard output digital data of forward looking infrared (FLIR) sensors including:

input signal means for receiving the input of timing signals and digital data from a FLIR sensor;

means for outputting vertical and horizontal signal outputs, from the inputted timing signals and digital data of the FLIR;

means for generating an output field index signal, also from the inputted timing signals and digital data of the FLIR;

means for the optionally bypassing the means for generating an output field index signal, such that input of an externally provided field index signal as part of a non-standard FLIR input is utilized whereby there is output vertical and horizontal signal outputs along with an externally provided field index signal.

2. A field synchronization technique of a field detect circuit adaptable for use with non-standard output digital data of forward looking infrared (FLIR) sensors including the steps of:

inputing timing signals and digital data from a FLIR sensor;

outputting vertical and horizontal signal outputs from the inputted timing signals and digital data of the FLIR;

generating an output field index signal, also from the inputted timing signals and digital data of the FLIR;

optionally bypassing the generated output field index signal, such that input of an externally provided field index signal as part of a non-standard FLIR input is utilized whereby there is output vertical and horizontal signal outputs along with an externally provided field index signal.

* * * * *